US009222573B2

(12) United States Patent
Giefer et al.

(10) Patent No.: US 9,222,573 B2
(45) Date of Patent: Dec. 29, 2015

(54) SHIFT-BY-WIRE ACTUATING DEVICE HAVING MECHANICAL PARKING BRAKE ACTUATION

(75) Inventors: Andreas Giefer, Lemfoerde (DE); Ludger Rake, Steinfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 13/321,953

(22) PCT Filed: Jul. 7, 2010

(86) PCT No.: PCT/DE2010/050044
§ 371 (c)(1),
(2), (4) Date: Nov. 22, 2011

(87) PCT Pub. No.: WO2011/012124
PCT Pub. Date: Feb. 3, 2011

(65) Prior Publication Data
US 2012/0111134 A1    May 10, 2012

(30) Foreign Application Priority Data

Jul. 30, 2009   (DE) .......................... 10 2009 028 128

(51) Int. Cl.
*B60K 6/00*   (2007.10)
*F16H 59/02*   (2006.01)
(Continued)

(52) U.S. Cl.
CPC .......... *F16H 59/0204* (2013.01); *B60T 11/046* (2013.01); *F16H 63/48* (2013.01); *F16H 59/105* (2013.01); *Y10T 74/20073* (2015.01)

(58) Field of Classification Search
CPC ..... F16H 59/0204; F16H 59/10; F16H 63/48; B60T 11/046; Y10T 74/20073
USPC .......................... 74/473.15, 473.19
See application file for complete search history.

(56) References Cited

U.S. PATENT DOCUMENTS 4,712,640 A * 12/1987 Leigh-Monstevens et al. ............................ 180/336
5,129,278 A * 7/1992 Nakao ........................ 74/473.33
(Continued)

FOREIGN PATENT DOCUMENTS

DE    103 26 118    1/2005
DE    103 61 209 B3    6/2005
(Continued)

OTHER PUBLICATIONS
International Search Report dated Oct. 12, 2010.
(Continued)

*Primary Examiner* — William Kelleher
*Assistant Examiner* — Zakaria Elahmadi
(74) *Attorney, Agent, or Firm* — Cohen & Hildebrand, PLLC

(57) ABSTRACT

The structure and the installation of the mechanical transmission linkage to the parking lock is simplified in that the mechanical transmission linkage allows a smooth operation and serves also as an actuating devices having more than one shift gate without requiring complex modifications. An actuating device for selecting gear steps of a shift-by-wire gearshift transmission with a base housing, a selection lever, mechanical transmission for actuating a parking lock, and with a coupling system with a coupling element between the selection lever and the transmission. The transmission is selectively actuated by the coupling element only during selection and/or deselection of the parking lock position on the selection lever. The actuating device has includes the coupling element with a first end which is linearly guided in a slot and a second end which is in certain sections pivotally guided in a slot. The two ends of the coupling element are each supported on both sides in associated slotted tracks in the base housing. The coupling element is indirectly coupled to the selection lever.

12 Claims, 8 Drawing Sheets

(51) Int. Cl.
*B60T 11/04* (2006.01)
*F16H 63/48* (2006.01)
*F16H 59/10* (2006.01)

(56) References Cited

U.S. PATENT DOCUMENTS

| | | | | |
|---|---|---|---|---|
| 5,144,853 | A * | 9/1992 | Giudici | 74/473.15 |
| 5,706,702 | A * | 1/1998 | Yamada | 74/473.15 |
| 5,921,141 | A * | 7/1999 | Gouselis | 74/473.33 |
| 6,196,079 | B1 * | 3/2001 | Paparoni | 74/473.15 |
| 6,382,046 | B1 * | 5/2002 | Wang | 74/473.15 |
| 6,550,351 | B1 * | 4/2003 | O'Reilly et al. | 74/335 |
| 6,662,924 | B2 * | 12/2003 | Giefer et al. | 192/220.7 |
| 6,732,847 | B1 * | 5/2004 | Wang | 192/220.4 |
| 7,322,457 | B2 * | 1/2008 | Giefer et al. | 192/219.4 |
| 7,334,497 | B2 * | 2/2008 | Giefer et al. | 74/473.12 |
| 7,765,049 | B2 * | 7/2010 | Potter et al. | 701/70 |
| 8,327,732 | B2 * | 12/2012 | Giefer et al. | 74/473.23 |
| 8,328,683 | B2 * | 12/2012 | Tseng et al. | 477/8 |
| 2008/0098845 | A1 * | 5/2008 | Meyer | 74/473.26 |
| 2009/0211388 | A1 * | 8/2009 | Meysenburg et al. | 74/473.15 |

FOREIGN PATENT DOCUMENTS

| | | |
|---|---|---|
| DE | 10 2007 015262 A1 | 10/2007 |
| DE | 10 2007 011 614 | 9/2008 |
| DE | 102007011614 A1 | 9/2008 |
| DE | 10 2007 058823 A1 | 6/2009 |
| EP | 0757192 A2 | 2/1997 |
| EP | 0757192 | 5/1997 |
| EP | 1262689 A1 | 12/2002 |
| EP | 1262689 | 8/2004 |
| WO | 03 080411 A1 | 10/2003 |

OTHER PUBLICATIONS

Copending U.S. Appl. No. 13/321,924, filed Nov. 22, 2011.
International Search Report of PCT Application No. PCT/DE2010/050043 corresponding to co-pending U.S. Appl. No. 13/321,924 dated Oct. 27, 2010.
Specification of co-pending U.S. Appl. No. 13/321,924, filed Nov. 22, 2011.

* cited by examiner

SHIFT-BY-WIRE ACTUATING DEVICE HAVING MECHANICAL PARKING BRAKE ACTUATION

This is an application filed under 35 USC §371 of PCT/DE2010/050044 on Jul. 7, 2010 and claiming priority to DE 10 2009 028 128.2 filed on Jul. 30, 2009.

BACKGROUND OF THE INVENTION

The invention relates to an actuating device for selecting gear steps of a shift-by-wire gearshift transmission, with a mechanical transmission means for parking lock actuation, according to the preamble of claim 1.

Parking locks are always employed when non-mechanical components are used for transmitting drive forces in an automobile, in particular in automatic transmissions having a hydrodynamic torque converter, i.e., if no continuous positive mechanical connection exists between the automobile engine and the wheels of the automobile even if a gear is engaged.

Automobiles with automatic transmission therefore have typically a parking lock to prevent the vehicle from accidentally rolling when the vehicle is at rest and the engine is shut off. The parking lock hereby blocks—as a result of a corresponding actuation by the driver—the driven transmission shaft which is always connected with the drive wheels so as to be secured against rotation, at least by bringing a pawl arranged in the automatic transmission into engagement with the toothing of a parking lock wheel arranged on the driven transmission shaft.

In principle, various mechanical, electrohydraulic and electromechanical systems are known as a transmission device between such parking lock constructed, for example, as a pawl and the actuating device for the vehicle transmission arranged in the passenger compartment of the automobile. Mechanical transmission devices for actuating the parking lock include, for example, a Bowden cable between the selection lever located in the passenger compartment and the transmission control arranged on the automatic transmission.

To improve the structural design with respect to the free arrangement of the actuating device in the passenger compartment, and to ensure an improved acoustic decoupling of the actuating device from the drive train of the automobile, modern automobiles or automatic transmissions increasingly employ a shift-by-wire principle, because modern automatic transmission are increasingly controlled entirely electronically.

Such "shift-by-wire" transmissions transmit the shift commands from the actuating device or from the selection lever of the automatic transmission generally exclusively electrically or electronically. In some situations, the parking lock may even be actuated automatically, for example with "Auto-P", where the parking lock is automatically engaged when the ignition key is pulled out or the occupants exit the automobile.

However, there is the additional requirement that the parking lock must also be operable mechanically when electronic systems fail or the electrical power supply of the automobile fails, so that the vehicle can be moved even under these circumstances. This may occur, for example, when the vehicle is in a repair shop or is towed in the event of a defect. Shift-by-wire actuating devices for automatic transition are also known, where an additional mechanical connection, for example a Bowden cable, is installed between the selection lever and the transmission. The parking lock can then be operated mechanically by way of the Bowden cable even if the electrical systems fail completely, so that the vehicle can always be moved and again safely be parked.

Moreover, shift-by-wire actuating devices for vehicle transmissions are known, wherein only the different drive stages or gear stages are engaged or shifted with electrical signals, whereas the parking lock is actuated—in particular for safety considerations—essentially by a mechanical connection between the actuating device and the vehicle transmission.

To minimize the actuating travel of the Bowden cable between the actuating device and the transmission in these actuating devices, to prevent unnecessary wear of the mechanical parking lock actuator and to minimize drag caused by the mechanical parking actuation when the selection lever is operated, actuating devices have been developed where the Bowden cable for the mechanical actuation of the parking lock can be selectively moved only when the selection lever is actually shifted into or out of the parking lock position. Conversely, the mechanical parking lock actuation is decoupled from the selection lever during all other movements of the selection lever between the individual gear stages or shift gates—by a corresponding design of the mechanical transmission linkage in the actuating device. The other selection lever movements can then be easily performed, without feedback of the friction forces from the mechanical parking lock actuation to the selection lever.

An actuating device of this generic type is disclosed, for example, in the patent DE 103 26 118 B4. This conventional actuating device includes a selection lever movable along a shift gate and a Bowden cable as a mechanical transmission means for actuating the parking lock. This conventional actuating device also includes a mechanical transmission linkage with a multiple joint linkage in form of coupled transmission elements, wherein the multiple joint linkage operates the Bowden cable to the parking lock—only when the selection lever is moved into the parking lock position or out of the parking lock position.

However, the design and installation of this conventional actuating device is relatively complex, in particular because of the multiple joint linkage in this actuating device which has a plurality of fork-shaped transmission elements that must be brought into engagement with a control plate arranged on the selection lever. Moreover, the conventional actuating device is initially limited to a movement of the selection lever along only a single shift gate, because the selection lever cannot be tilted to the side as a result of the multiple joint linkage formed at that location.

In order to be able to use this conventional actuating device also in conjunction with selection levers to be moved along several shift gates, for example in an automatic shift gate and in a manual touch gate, either the entire arrangement formed of selection lever, control plate and multiple joint linkage must be expanded by an additional universal joint and pivotally supported, or an additional swivel joint must be provided in the shaft of the selection lever. This conventional actuating device may also exhibit rattling noises when the components of the employed multiple link connection do not engage with each other and with the control plate entirely without play.

In view of this background, it is an object of the present invention to provide an actuating device, with which the installation of the mechanical transmission linkage for selective actuation of the transmission means to the parking lock can be simplified, while simultaneously ensuring a smooth, reliable and low-noise actuation. Other important objects of the present invention are directed to constructing the mechanical transmission linkage so that it can be used with actuating devices having more than one shift gate. Moreover, potential cost savings compared to conventional solutions with more complex structures will be described.

BRIEF SUMMARY OF THE INVENTION

These objects are attained with an actuating device according to claim 1. Advantageous embodiments are recited in the dependent claims.

In an initially conventional manner, the actuating device according to the present invention is used for selecting gear steps and for generating the associated shift commands for a shift-by-wire-controlled transmission, for example for an automatic transmission of an automobile. The actuating device hereby includes, in a likewise conventional manner, a base housing with a selection lever that is movable along at least one shift gate between at least two gear stage positions and a parking lock position, as well as a mechanical transmission means to the gearshift transmission for the parking lock actuation. The actuating device also includes a coupling system with a coupling element disposed between the selection lever and the transmission means. The transmission means is hereby operated by the coupling element only when the parking lock position is selected and/or deselected with the selection lever, whereas the transmission means is not operated by other movements of the selection lever.

According to the invention, the actuating device is characterized in that one end of the coupling element is linearly guided in a slot in the base housing of the actuating device, while the other end of the coupling element is pivotally guided in a slot—within a partial range of its movement path and indirectly coupled to the selection lever. The ends of the coupling element are each coupled on both sides with guide axis stubs in associated slots in the base housing.

Regardless of how the coupling element is structurally coupled to the selection lever, this has initially the advantage that the coupling element is guided very stably and without significant play on two-sides in the slot of the base housing.

Unlike in the state of the art, the coupling element is hereby not in direct contact or in direct engagement with the selection lever, but is instead indirectly coupled to the selection lever. As a result, the actuating device according to the invention has a simpler structure and can also be employed with gear patterns having several shift gates arranged side-by-side, for example an automatic shift gate and a manual touch gate. Because both ends of the coupling element are guided in the slots arranged in the base housing—instead of the conventional control plate arranged on the selection lever—as well as due to the indirect coupling of the coupling element to the selection lever, the selection lever can now also have a lateral degree of movement (for example, by a support in a ball joint), realizing a simpler structure for changing a shift gate.

The invention is initially implemented regardless of the construction and arrangement of the slotted tracks, as long as both ends of the coupling element are securely guided. According to another preferred embodiment of the invention, the two sides of the slotted guide are—for receiving the guide axis stubs of the coupling element guided on both sides in the slotted guide—each formed as one piece with the wall of the base housing of the actuating device. With this embodiment, the lateral walls of the housing of the base of the actuating device can advantageously simultaneously structurally guide the guide axis stubs of the coupling element in the slots. This advantageously reduces the number of parts and the installation complexity, resulting in potential additional cost reductions.

The invention is also implemented independent of the type of the indirect coupling of the coupling element on the selection lever, as long as this coupling allows conversion of the movement on the selection lever into movement degrees of freedom of the coupling element. According to a preferred embodiment of the invention, the connection between the coupling element and the selection lever is attained by sequentially arranging a connecting rod element arranged on the side of the coupling element and a slider element arranged on the side of the selection lever. Preferably, the slider element includes both a longitudinal slider and a transverse slider. The slide element is hereby used for coupling for the selection lever to the coupling element to allow a substantially linear movement and therefore also to the transmission means for actuating the parking lock. If the slider element is equipped with the additional transverse slider, as contemplated in a preferred embodiment, then the required transverse movement of the end of the selection lever can also be realized in a situation where the actuating device has more than one shift gate.

The slider element with the longitudinal slider and the transverse slider is hereby used to convert the movement of the lower end of the selection lever which occurs in all three spatial directions into a purely translatory slider motion along the direction of motion of the connecting rod element or the Bowden cable. The slider element is hereby constructed so that movements of the selection lever and in the transverse direction as well as in the vertical direction—through a corresponding sliding motion between transverse slider and longitudinal slider—are not transmitted to the additional transmission elements or to the parking lock Bowden cable. Movements of the selection lever in the longitudinal direction or parallel to the Bowden cable, however, are transmitted by the slide element to the additional transmission elements, in particular to the connecting rod element and therefore also to the coupling element.

According to an alternative embodiment of the invention, the coupling element is indirectly coupled to the selection lever—by connecting a connecting rod element and a swivel lever in sequence. According to a further embodiment of the invention, the connection between the selection lever and slider element, or preferably directly between selection lever and swivel lever, can be implemented in particular with a connecting Bowden cable.

In this embodiment, the coupling device with the coupling element can be separated from the other components of the actuating device. Accordingly, the coupling device in this embodiment of the invention may be an arranged at almost any location in the path of the parking lock Bowden cable through the vehicle. The invention can also be used with actuating devices where there is insufficient installation space for arranging the coupling device in the immediate vicinity of the shift lever or selection lever. However, with this embodiment, the invention can also be used in conjunction with already installed actuating devices with parking lock Bowden cable actuation by arranging the coupling device at a substantially arbitrary location in the path of the parking lock Bowden cable of the actuating device. In this way, existing actuating devices can be retrofitted while providing the characteristics and advantages of the invention.

According to another advantageous embodiment of the invention, the coupling element guided in the slot can also be attached to the transmission means (for example, to the Bowden cable leading to the parking lock) and/or to the connecting rod element coaxially with respect to the associated guide axis stubs of the coupling element.

In this way, the coupling element and its force-transmitting connection with the adjoining components can have a particularly simple configuration, in that the guide axis stubs of the coupling element, which protrude from both sides of the coupling element and engage with the slotted guide are simultaneously configured as a seat, in particular fro connecting bolts, wherein the connecting bolts in turn form a connection of the coupling element to the transmission means or to the connecting rod element. Alternatively, connecting bolts of the coupling element suitable to connect to the transmission means or the connecting rod element can simultaneously form the guide axis stubs protruding from the sides of the coupling element, which are then used for guiding the coupling element through engagement in the slotted guide.

In additional embodiments of the invention, the transmission means may be a linkage or a single-acting or double-acting Bowden cable. In particular with a Bowden cable, the actuating device can be flexibly placed in the region of the cockpit or the center console of the automobile, wherein the double-acting Bowden cable enables at the same time the transmission of both pulling and pushing forces for actuating the parking lock.

BRIEF DESCRIPTION OF THE DRAWINGS

The invention will now be described in more detail with reference to the drawings which merely illustrate exemplary embodiments.

DETAILED DESCRIPTION OF THE INVENTION

Figure 1:
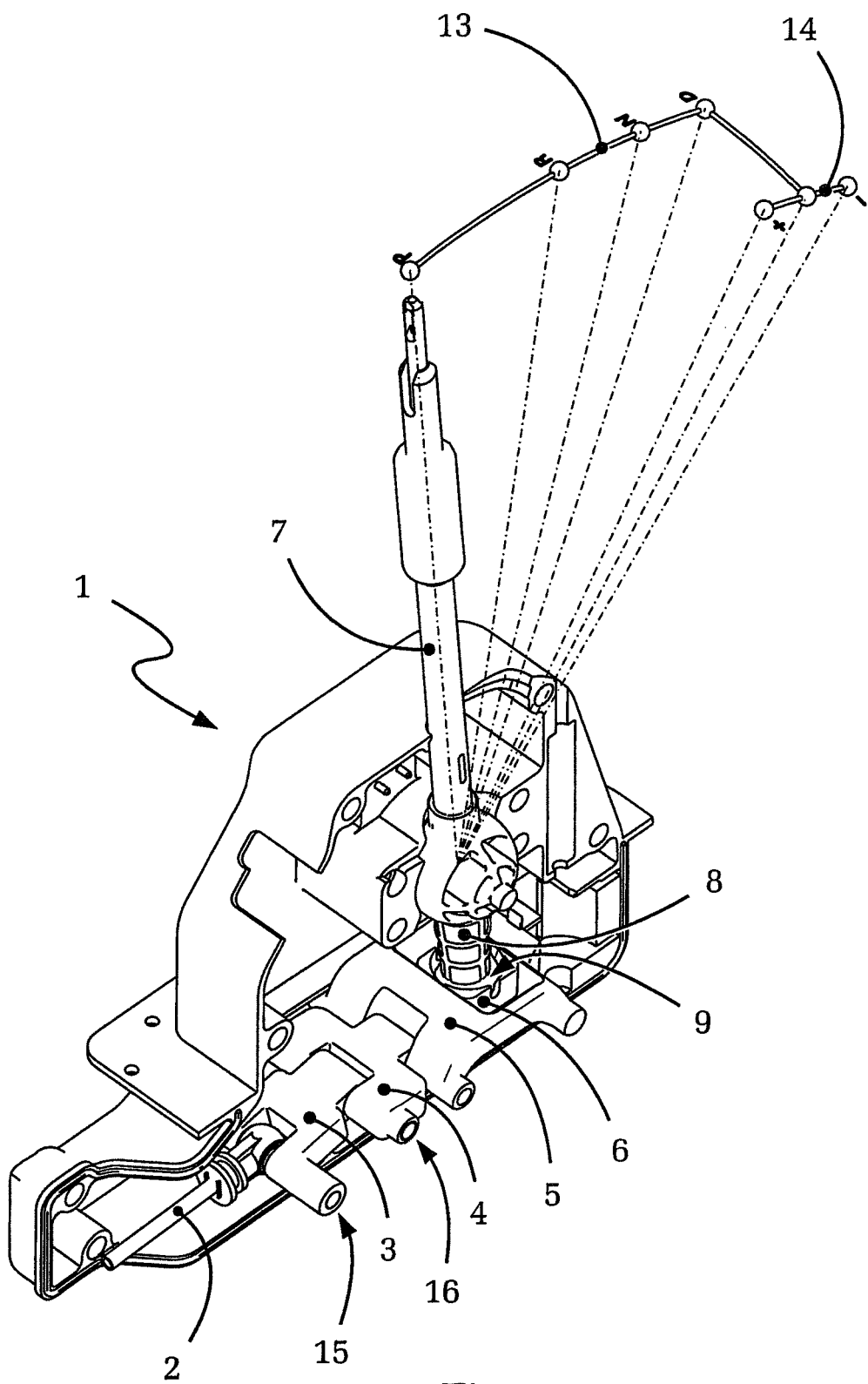
FIG. 1 shows in an isometric view an embodiment of an actuating device according to the invention with mechanical parking lock actuation, with the parking lock engaged.

FIG. 1 shows in an isometric view an embodiment of an actuating device according to the invention for a shift-by-wire-shifted transmission, wherein the actuating device of a general type includes an additional mechanical parking lock actuation. With the illustrated actuating device, the parking lock is mechanically actuated with a Bowden cable 2 which is connected to the lower end of the selection lever 7 by way of a coupling device—consisting here of a series of coupling elements 3, 4, 5, 6 coupled with one another.

With respect to the mechanical transmission linkage, reference is first made to the coupling element 3 which has an end with guide axis stubs 15 linearly guided in slots as well as an end 16 which is guided in a slot linearly in some sections and pivotally in other sections, also having guide axis stubs 16. The respective guide axes stubs 15, 16 arranged on the two ends engage here in a linear slot pair 10 (Bowden-cable-side end) and/or in a slot pair 11 which is formed partially linearly and partially in form of a segment of a circle (selection lever side end of the coupling element 3). The arrangement and design of the slot pair 10 on 11, which are partially obscured by the housing 1 in FIG. 1, are more clearly indicated in particular in FIG. 2 and FIG. 5.

The coupling element 3 is hereby guided by the slotted guides 10, 11 such that the end 15 of the coupling element on the side of the Bowden cable moves linearly (and thus mechanically operates the Bowden cable 2 and the parking lock) only when the selection lever 7 is actually moved into the parking lock position or out of the parking lock position. During other movements of the selection lever 7 in the automatic shift gate 13, in the touch gate 14 and between the automatic shift gate 13 and the touch gate 14, there is no movement of the end 15 of the coupling element 3 on the Bowden cable side. Instead, the coupling element is during these movements of the selection lever 7 at most pivoted about the guide axis stubs 15 on the Bowden cable side when the guide axis stubs 16 on the selection lever side sliding along the section of the slot 11 shaped as the segment of a circle cause a pivoting motion. The cooperation of the coupling element 3 with the slots 10, 11 is again shown clearly and in detail in FIGS. 2 and 6, whereby reference is made to the following description.

The embodiment illustrated in FIG. 1 shows the connection between the coupling element 3 and the selection lever 7 by way of the additional transmission elements 4, 5 and 6. These are, more particularly, the connection rod element 4 and the longitudinal slider 5, wherein the connection rod element 4 is responsible for converting the purely linear motion of the longitudinal slider 5 into the likewise partially linear motion of the coupling element 3 (in a situation where the Bowden cable 2 and thus the parking lock are actuated), as well as into the pivoting motion of the coupling element 3 (for the other movements of the selection lever in the automatic shift gate 13 or in the touch gate 14). Furthermore, the transverse slider 6 which is coupled via a ball joint 9 to the lower end 8 of the selection lever is arranged in the longitudinal slider 5. The transverse slider 6 hereby allows the free sideways movement of the selection lever 7 if the shift gate changes between the automatic shift gate 13 and the touch gate 14, as well as slight vertical movements of the lower end 8 of the selection lever which occur during pivoting movements of the selection lever.

The embodiments illustrated in FIGS. 1 to 8 illustrate actuating devices wherein the parking lock is activated by a pulling actuation of the parking lock Bowden cable 2. However, the invention can also be implemented if the parking lock is engaged by a pushing/pressing actuation of the Bowden cable, or by releasing the parking lock Bowden cable 2. In such situation, pressing/pushing forces, and not pulling forces as in the embodiments of FIGS. 1 to 8, would be transmitted via the force transmission chain "transverse slider 6, longitudinal slider 7, connecting rod element 4, coupling element 3" upon actuation of the parking lock; or the pulling forces would in this situation not be transmitted when the parking lock is disengaged (see FIGS. 1 to 8), but instead during engagement of the parking lock.

Figure 2:
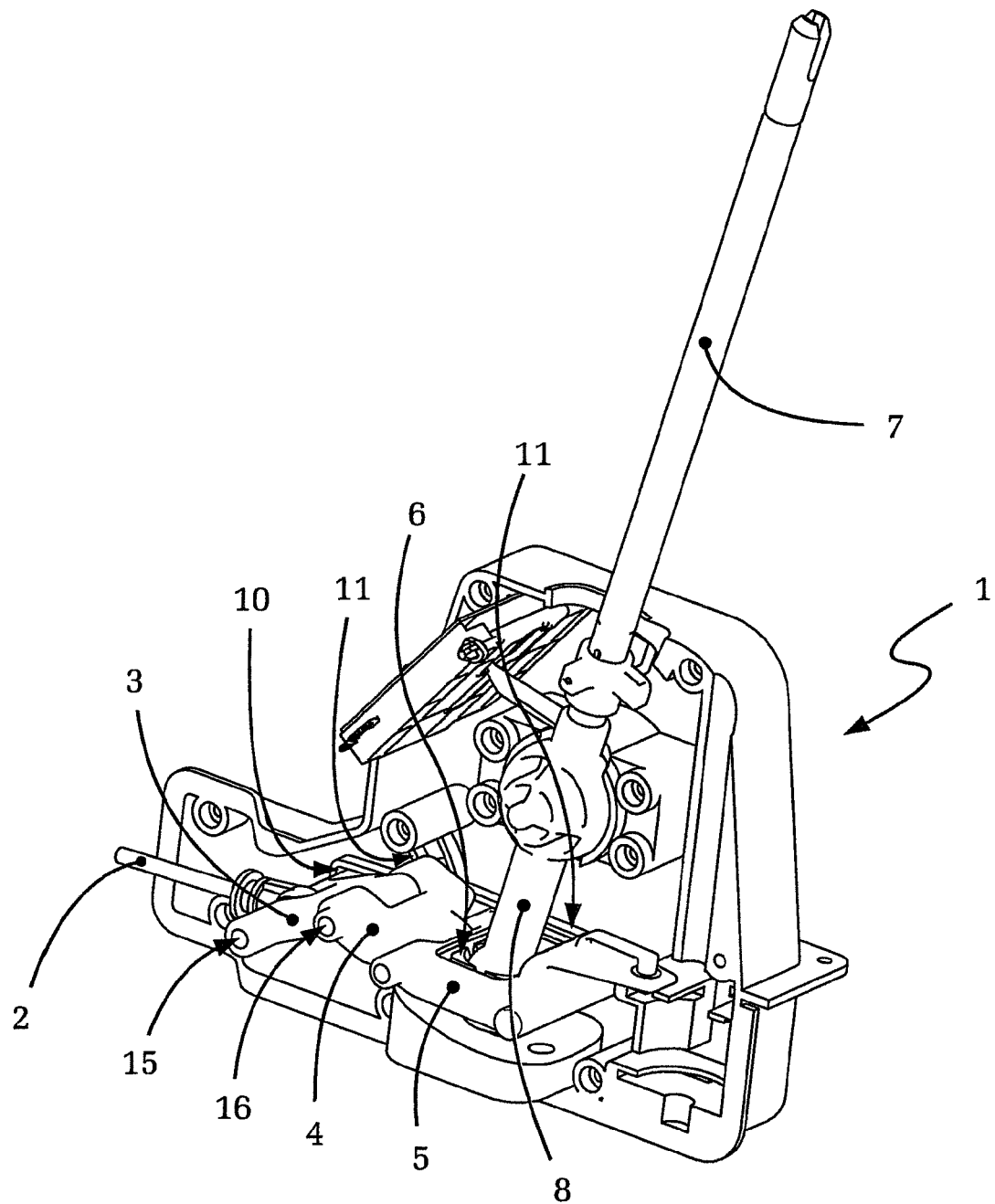
FIG. 2 shows in a diagram corresponding to FIG. 1 a comparable additional embodiment of an actuating device according to present invention, with the parking lock disengaged.

FIG. 2 shows likewise an embodiment of the actuating device according to the invention, which is identical in most aspects with the embodiment of FIG. 1; however, FIG. 2 shows a different view. Visible is again the selection lever 7, the parking lock Bowden cable 2 and the coupling system or force transmission chain between the lower end of the selection lever 7 and the attachment point on the parking lock Bowden cable 2, which includes the slider element 5, the connecting rod element 4 and the slot-guided coupling element 3.

Compared to FIG. 1, FIG. 2 also shows more particularly the slots 10, 11, in which (in addition to the longitudinal slider 5) the coupling element 3 is guided with its guide axis stubs 15, 16 arranged on both sides. Unlike FIG. 1, where the parking lock is selected on the selection lever 7 (see also FIG. 3) so that the transmission elements 6, 5, 4 and the coupling element 3 are in a stretched position and thus hold the Bowden cable 2 in the tensioned position which actuates the parking lock, the neutral position "N" is selected on the selection lever 7 in FIG. 2 (see also FIG. 5). The transmission elements 6, 5, 4 and the coupling element 3 are therefore in FIG. 2 no longer in the stretched position (illustrated in FIGS. 1 and 2).

Instead, by moving the selection lever 7 from the parking lock position shown in FIG. 1 into the neutral position shown in FIG. 2, the slider element 5 is first moved (with respect to the drawing) to the left. As a result, the connecting rod element 4 coupled with the slider element 5 and the coupling element 3 which is also coupled to the connecting rod element 4, together with the parking lock Bowden cable 2 engaging on the coupling element 3 moves (with respect to the drawing) to the right until the guide axis stubs 15 of the coupling element 3 arranged on the Bowden-cable-end of the coupling element 3 strike the Bowden-cable-side of the associated slotted guides 10, see also the situation in FIG. 5 which is identical to that of FIG. 2.

Figure 4:
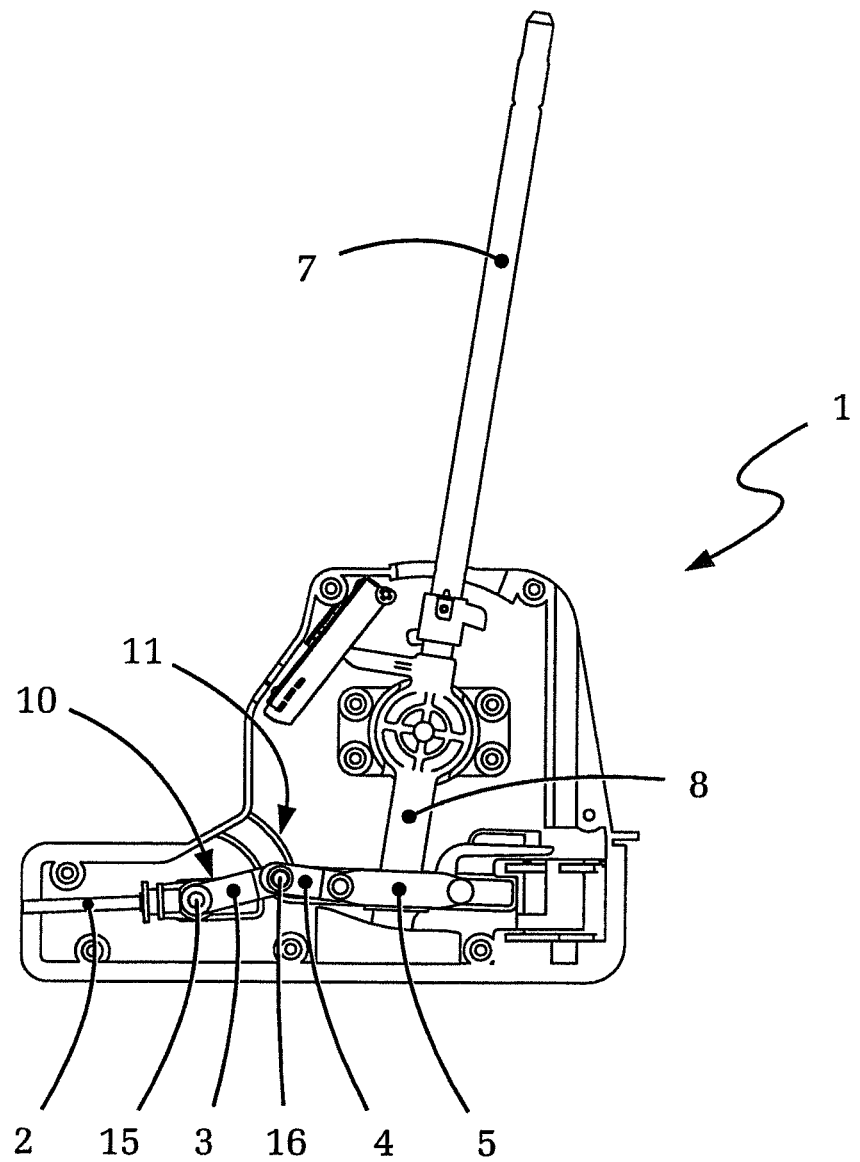
FIG. 4 shows in a diagram and a view corresponding to FIG. 3 the actuating device to FIGS. 2 and 3, with the parking lock disengaged.
Figure 5:
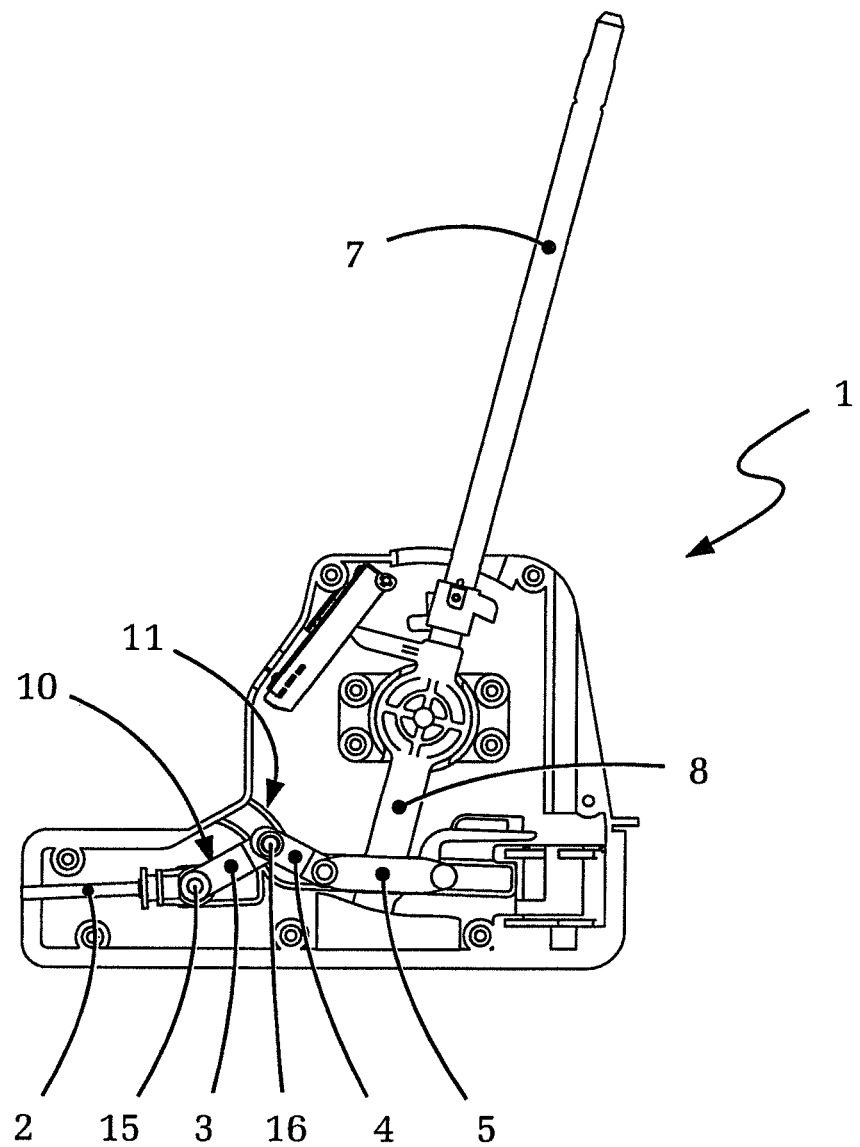
FIG. 5 shows in a diagram and a view corresponding to FIGS. 3 and 4 the actuating device according to FIGS. 2 to 4, with the selection lever in position "N"
Figure 6:
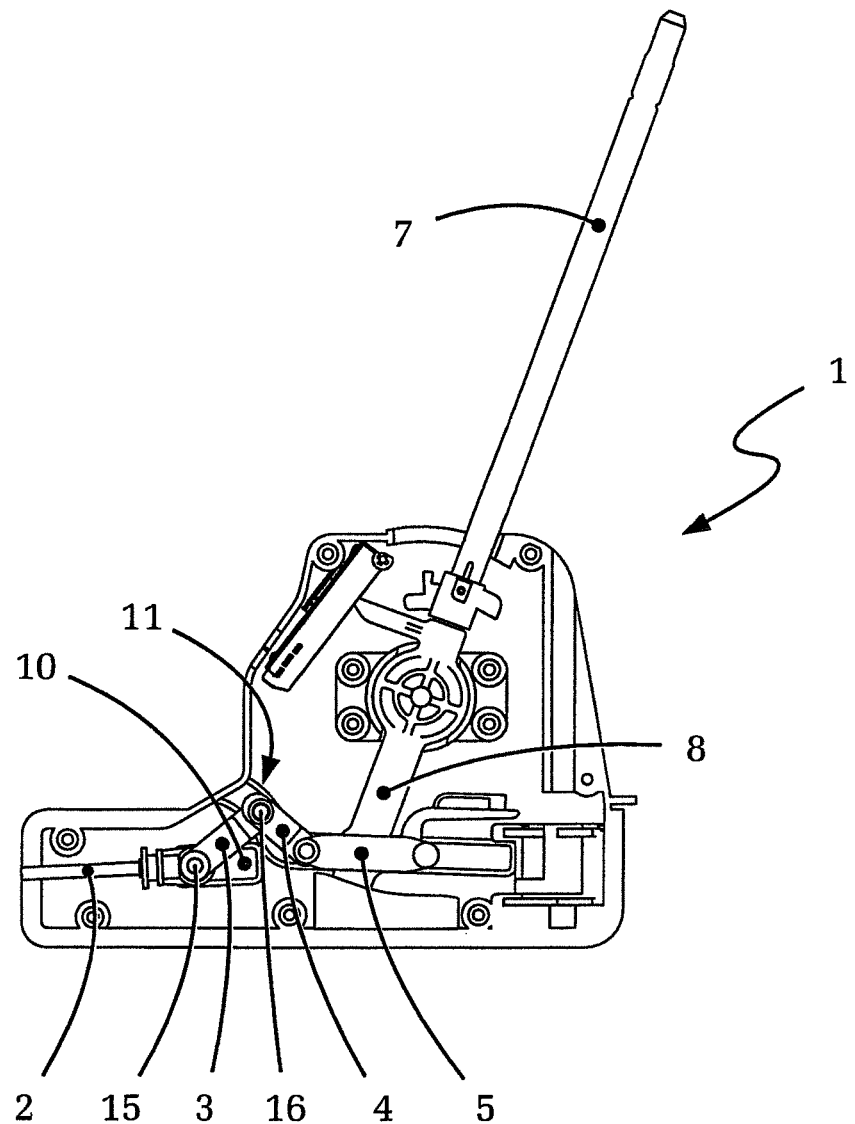
FIG. 6 shows in a diagram and a view corresponding to FIGS. 3 to 5 the actuating device according to FIGS. 2 to 5, with the selection lever in position "D" or in the touch gate.

When the slider element 5 moves farther to the left (with respect to the drawing), the knee lever formed of the connecting rod element 4 and the coupling element 3 buckles in that the coupling element 3 is pivoted counterclockwise about the Bowden-cable-side guide axis stubs 15 forming the pivoting axis, wherein the selection-lever-side guide axis stubs 16 slide in the arcuate section of the additional slotted guide 11, see also FIGS. 4 to 6 in combination.

In other words, after the selection lever 7 is moved out of the parking lock position in the automatic shift gate 13 (see FIG. 1→FIG. 2 and/or FIG. 3→FIG. 4) into one of the additional selection lever positions R, N, D or into the touch gate 14—and after the resulting relaxation of the Bowden cable 2—there is no additional actuation or movement of the Bowden cable 2 or of the parking lock actuation (not shown) arranged on the transmission side on the Bowden cable 2. This also eliminates the noise generation associated with the actuation and movement of the parking lock Bowden cable 2, the associated wear and the required actuating forces. The various gear stages and-or operating states of the automatic transmission can then be precisely and smoothly selected with the electronic shift-by-wire function of the illustrated selection lever device.

The combination of FIGS. 3 to 6 shows again particularly clearly the operation of the mechanical actuation of the parking lock (described above with reference to FIGS. 1 and 2) via the coupling system and via the slot-guided coupling element 3 and the a parking lock Bowden cable 2, which occurs selectively only when the selection lever 7 is actually moved into the parking lock position P or out of the parking lock position P.

Figure 3:
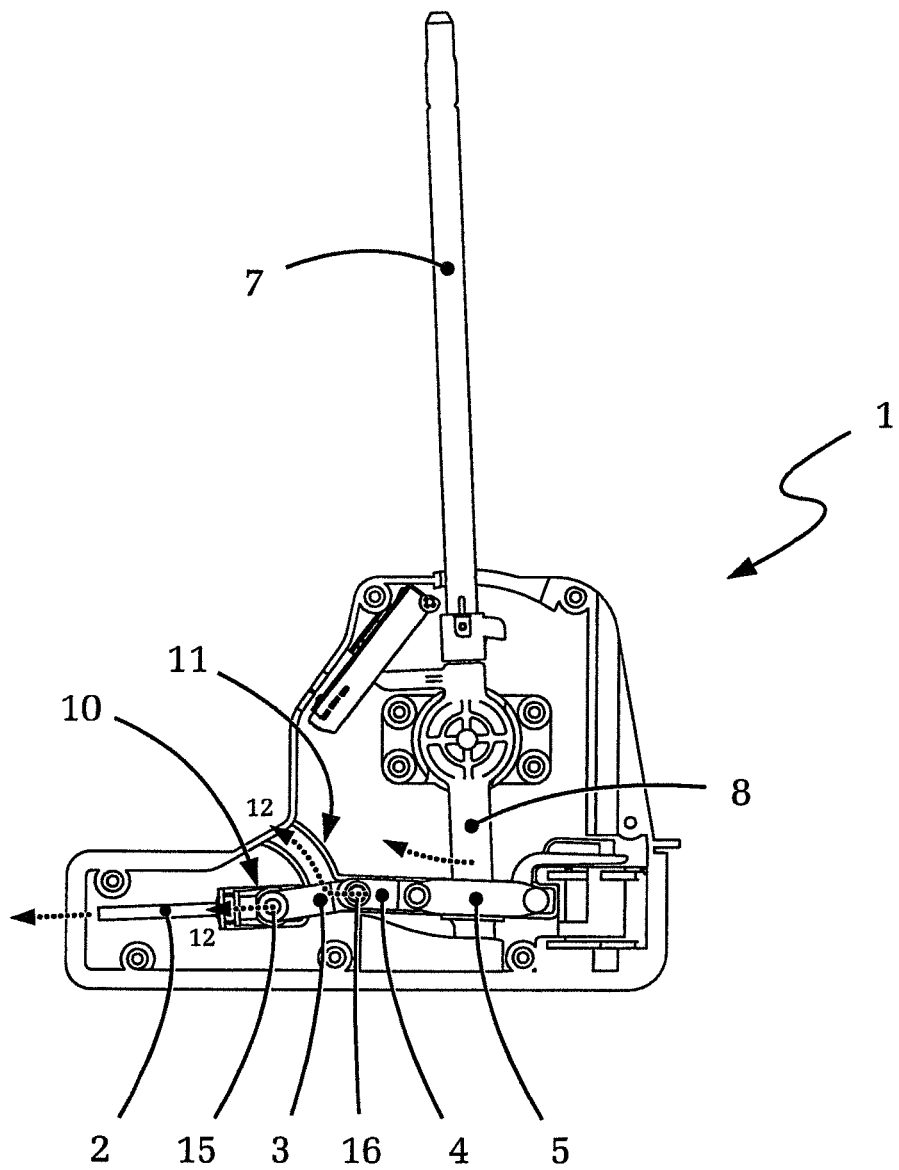
FIG. 3 shows in a schematic side view the actuating device according to FIG. 2, with the parking lock engaged.

Based on the travel paths of the guide axis stubs 15, 16 of the coupling element 3 illustrated in FIG. 3 by dotted lines, which are guided in the slots 10 and 11 in the housing of the selection lever device, the coupling element 3 is initially moved purely linearly along the dotted arrows 12 to the left (with reference to the drawing) when the selection lever 7 is moved out of the parking lock position P, associated with a corresponding actuation of the parking lock Bowden cable 2 and hence of the parking lock actuation (not illustrated) arranged on the Bowden cable 2 on the transmission-side.

During further movement of the selection lever 7 between the different gear stages R, N, D or between the shift gates 13 and the touch gate 14 as well as within the touch gate 14 itself, the guide axis stubs 15 of the coupling element 3 on the side of the Bowden cable strike the end of the slotted guide 10 on the side of the Bowden cable, whereas the guide axis stubs 16 on the side of the selection lever are forced to perform a pivoting motion about the guide axis stub 15 on the side of the Bowden cable representing a pivot axis due to the blocking action of the guide axis stubs 15 on the side of the Bowden cable and due to the shape of the additional slotted guide 11 implemented as segment of a circle (see FIGS. 4 to 6). During all movements of the selection lever 7 between the drive stages R, N, D of the shift gate 13 and between the actuating positions "+" and "−" within the touch gate 14 (see FIG. 1), the coupling element 3 only performs a pivoting motion about its guide axis stub 15 on the side of the Bowden cable, so that the Bowden cable 2 is not further actuated or moved.

The parking lock Bowden cable 2 and the parking lock actuation connected with the Bowden cable 2 on the transmission side are therefore operated gently and are only actuated or moved when the parking lock is actually to be engaged or disengaged. The actuating forces on the selection lever 7 are then also reduced, because the sometimes significant friction forces in the Bowden cable 2 as well as in the connected parking lock actuation need no longer be overcome during the normal gear selection or shifting between the different gear stages of the gear-shift transmission.

As particularly clearly illustrated in FIG. 3, the slotted guides 10, 11 are arranged above one another with a slight offset in their vertical position, so that the force transmission chain formed of the coupling element 3 and the connecting rod element 4—similar to a knee lever—is unable to assume a completely stretched configuration, which may otherwise cause self-locking for the arcuate pivoting motion of the coupling element 3.

Figure 7:
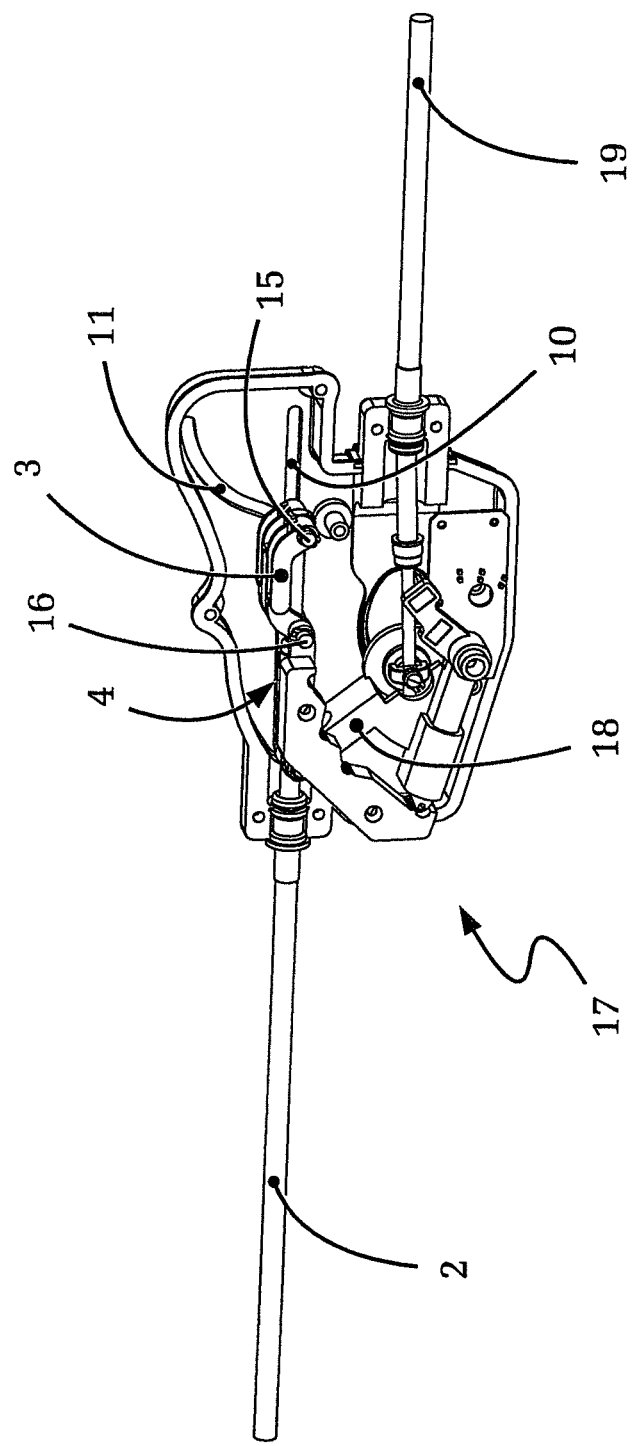
FIG. 7 shows in an isometric view the coupling system of an alternative embodiment of the invention, with the coupling system arranged separate from the selection lever, with the selection lever in position "P"
Figure 8:
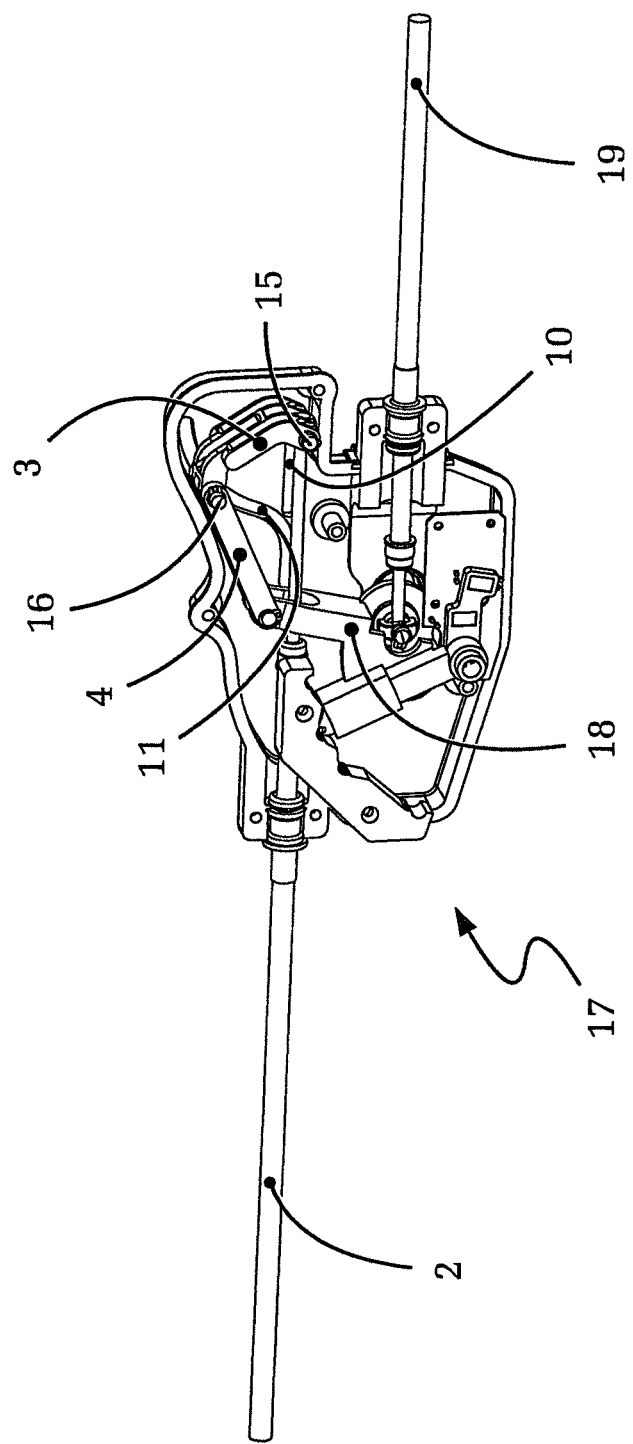
FIG. 8 shows in a diagram and view corresponding to FIG. 7 the coupling system according to FIG. 7, with the selection lever in position "N".

FIGS. 7 and 8 show the coupling system in an alternative embodiment of the invention. In this embodiment, the coupling system with connecting rod element, coupling element and slotted guide, is housed—separate from the actual shift and selection lever—in a dedicated housing 17 and coupled to the (unillustrated) selection lever 7 with a connecting Bowden cable 19. Regardless if the selection lever 7 is coupled via the connecting Bowden cable 19 directly or, for example, also via a slider element 5, the coupling member 3 in this embodiment is also operated by way of a connecting rod element 4.

In this embodiment, the coupling member 3 is likewise guided by way of guide axis stubs 15, 16 arranged on both sides in corresponding slotted guides 10, 11 in the housing 17 of the coupling system which is here separated from the selection lever 7. In this alternative embodiment, the connecting rod element 4 is operated by a pivoting lever 18, wherein the pivoting lever 18 is coupled to the movements of the selection lever 7 via the connecting Bowden cable 19.

FIG. 7 shows the coupling system in a position where the parking lock is engaged on the selection lever 7, whereas FIG. 8 shows the coupling system in an activated position where the neutral position is engaged on the selection lever 7. As shown in particularly in FIG. 8, for selection lever positions outside the parking lock position, the coupling member 3 follows the movements of the selection lever only with its left end (in relation to the drawing), while pivoting about its right end (in relation to the drawing), whereas the right end of the coupling member 3 does hereby not perform any additional movements, and therefore also does not transfer any additional actuating movements to the parking lock Bowden cable 2.

The embodiment according to FIGS. 7 and 8 differs from the embodiments of FIGS. 1 to 6 mainly in that the coupling system with the connecting rod element 4, the coupling element 3 and the slotted guides 10, 11 are here arranged separate from the actual selection lever device and can be positioned at any location along the parking lock Bowden cable 2 in the vehicle. Preferably, the self-contained coupling system according to this embodiment is positioned proximate to the selection lever device so as to keep the connecting Bowden cable 19, which unlike the parking lock Bowden cable 24 follows every movement of the selection lever 7, as short as possible and the friction losses in the connecting Bowden cable 19 as small as possible.

In summary, the invention provides an actuating device, in particular for shift-by-wire-operated automatic transmissions, wherein the design and the installation of the mechanical transmission linkage required for selectively mechanically operating the parking lock can be simplified. In particular, the mechanical transmission linkage according to the invention is suitable for actuating devices having more than one shift gate, without requiring complex changes or upgrades.

The haptic of the actuating device according to the invention is also smooth, low-noise and reliable in its operation. The number of components can be reduced and associated cost savings compared to conventional actuating devices of this type can be achieved.

LIST OF REFERENCES SYMBOLS

1 Housing, base housing
2 Transmission means, Bowden cable
3 Slot-guided coupling element
4 Connecting rod element
5 Longitudinal slider
6 Transverse slider
7 Selection lever
8 Lower end of selection lever
9 Ball joint
10, 11 Slotted guide
12 Movement direction
13 Shift gate
14 Touch gate
15, 16 Guide axis stub
17 Housing, base housing
18 Pivoting lever
19 Connecting Bowden cable

The invention claimed is:

1. An actuating device for selecting gear steps of a shift-by-wire gearshift transmission, the actuating device comprising
a base housing (1, 17),
a selection lever (7) having a free end, the selection lever (7) is moveable along at least one shift gate (13, 14) between at least two drive stage positions and a parking lock position (P),
a mechanical transmission device (2) to the gearshift transmission for actuating the parking lock,
a coupling system arranged between the selection lever (7) and the mechanical transmission device (2) and having a coupling element (3), wherein actuation of the transmission device (2) by the coupling system only occurs selectively during selection and deselection of the parking, lock position with the selection lever (7),
wherein the coupling element (3) has a first end (15) which is linearly guided in a first slot and a second end (16) which is guided in a second slot and coupled indirectly to the selection lever (7) and pivotable in a certain section, wherein each of the first and second end of the coupling element are supported on both sides by guide axis studs (15, 16) in associated slots (10, 11) disposed in the base housing (1, 17);
wherein the first end of the coupling element (3) is coupled to the mechanical transmission device (2) while the second end of the coupling element (3) is connected to a rod element (4); wherein when the selection lever is in a D position, the first end of the coupling element (3) is farther away from the free end of the selection lever (7) than the second end of the coupling element (3) and the coupling element (3) is angled relative to the mechanical transmission device (2).

2. The actuating device according to claim 1, wherein the two ends of the slotted guide (10, 11) for the coupling element (3) are each formed as one piece with a wall of the base housing (1).

3. The actuating device according to claim 1, wherein the coupling element (3) is coupled to the selection lever (7) by a series connection of the rod element (4) and a slider element (5).

4. The actuating device according to claim 3, wherein the slider element comprises a longitudinal slider (5) and a transverse slider (6).

5. The actuating device according to claim 1, wherein the coupling element (3) is indirectly coupled to the selection lever (7) by a series connection of the rod element (4) and a pivoting lever (18).

6. The actuating device according to claim 3, wherein the slider element (5) is coupled to the selection lever (7) by way of a connecting Bowden cable (19).

7. The actuating device according to claim 1, wherein the respective connection of the coupling, element (3) to the transmission device (2) and/or to the connecting rod element (4) is arranged coaxially with respect to the associated guide axes (15, 16) of the coupling element (3).

8. The actuating element according to claim 1, wherein the transmission device (2) is a linkage.

9. The actuating element according to claim 1, wherein the transmission device (2) is a single-acting or a double-acting Bowden cable (2).

10. The actuating element according to claim 1, wherein the coupling element (3) is indirectly coupled to the selection lever (7) by a series connection of a connecting rod element (4) and a pivoting lever (18), and
wherein the pivoting lever (18) is coupled to the selection lever (7) by way of a connecting Bowden cable (19).

11. The actuating device in accordance with claim 1, wherein the selection lever (7) has more than one shift gate.

12. The actuating device according to claim 5, wherein the pivoting lever (18) is coupled to the selection lever (7) by way of a connecting Bowden cable (19).

* * * * *

UNITED STATES PATENT AND TRADEMARK OFFICE
CERTIFICATE OF CORRECTION

PATENT NO. : 9,222,573 B2
APPLICATION NO. : 13/321953
DATED : December 29, 2015
INVENTOR(S) : Giefer et al.

Page 1 of 1

It is certified that error appears in the above-identified patent and that said Letters Patent is hereby corrected as shown below:

Claims

Column 10, Claim 1, line 5, delete ",".
Column 10, Claim 7, line 42, delete ",".

Signed and Sealed this
Twenty-second Day of March, 2016

Michelle K. Lee
*Director of the United States Patent and Trademark Office*